US010912957B2

(12) United States Patent
Allen

(10) Patent No.: US 10,912,957 B2
(45) Date of Patent: Feb. 9, 2021

(54) MULTI-FUNCTIONAL RESCUE TOOL WITH ANGLED BLADE

(71) Applicant: Jason Allen, Bonney Lake, WA (US)

(72) Inventor: Jason Allen, Bonney Lake, WA (US)

( * ) Notice: Subject to any disclaimer, the term of this patent is extended or adjusted under 35 U.S.C. 154(b) by 486 days.

(21) Appl. No.: 15/804,586

(22) Filed: Nov. 6, 2017

(65) Prior Publication Data
US 2019/0134433 A1 May 9, 2019

(51) Int. Cl.
A62B 3/00 (2006.01)
B26B 11/00 (2006.01)
(Continued)

(52) U.S. Cl.
CPC .............. A62B 3/005 (2013.01); B25B 13/50 (2013.01); B25F 1/006 (2013.01); B25F 1/04 (2013.01);
(Continued)

(58) Field of Classification Search
CPC . A62B 3/005; B25B 13/50; B25F 1/04; B25F 1/006; B26B 11/001; B26B 1/042;
(Continued)

(56) References Cited

U.S. PATENT DOCUMENTS 4,442,559 A * 4/1984 Collins ..................... B26B 3/06
30/153
5,657,543 A * 8/1997 Collins .................. A62B 3/005
30/123
(Continued)

FOREIGN PATENT DOCUMENTS

WO WO95/14508 A1 6/1995

OTHER PUBLICATIONS

Boker Magnum Firefighter Folding Knife—Gray Plain, Online Catalog, Total of 2 pages.
(Continued)

Primary Examiner — Monica S Carter
Assistant Examiner — Alberto Saenz
(74) Attorney, Agent, or Firm — Tracy M Heims; Apex Juris, pllc.

(57) ABSTRACT

A multifunctional rescue tool providing a plurality of tool components including an angled blade to disengage a lock shielded by a blocker plate and wherein the angled blade has a base portion and an integral elongate distal portion forming an angle along a contiguous planar surface that is preferably substantially perpendicular and is pivotally coupled to a handle having a corresponding slot configured for receiving the angled blade wherein the elongate distal portion is angled outwardly from the base portion of the angled blade in a preferably perpendicular orientation when the base portion and handle are locked in substantial alignment in an open position, and the angled blade is alternatively engageable to form additional angles to facilitate construction of raker shores while also including various tool components including a window breaker, seat belt cutter, gas shut off, oxygen tank, hexagonal wrenches, as well as, a lanyard, shove knife, and cutting knife in a compact configuration capable of convenient and ready carrying and stowing in a pocket or wearable gear of a firefighter or other first responder.

15 Claims, 5 Drawing Sheets

(51) Int. Cl.
*B25F 1/04* (2006.01)
*G01B 3/04* (2006.01)
*B60R 22/32* (2006.01)
*B25B 13/50* (2006.01)
*B26B 1/04* (2006.01)
*B25F 1/00* (2006.01)

(52) U.S. Cl.
CPC ............ *B26B 1/042* (2013.01); *B26B 11/001* (2013.01); *B26B 11/006* (2013.01); *B60R 22/32* (2013.01); *G01B 3/04* (2013.01); *B60R 2022/328* (2013.01)

(58) Field of Classification Search
CPC . B26B 11/006; B60R 22/32; B60R 2022/328; B60R 22/328; G01B 3/04
USPC ...................................... 7/118, 119
See application file for complete search history.

(56) References Cited

U.S. PATENT DOCUMENTS

| | | | |
|---|---|---|---|
| 6,899,001 | B1 | 5/2005 | Sanders et al. |
| 7,062,857 | B1* | 6/2006 | Nenadic ................ B26B 1/042 |
| | | | 30/161 |
| 7,437,822 | B2* | 10/2008 | Flagg ..................... B26B 1/044 |
| | | | 30/160 |
| 8,683,710 | B2* | 4/2014 | Johns .................. G01B 3/1084 |
| | | | 33/760 |
| 8,851,454 | B1 | 10/2014 | Watts |
| 8,959,779 | B2* | 2/2015 | Wen ....................... B26B 1/046 |
| | | | 30/161 |
| 9,315,369 | B2* | 4/2016 | Wang ..................... B25F 1/006 |
| 10,144,139 | B2* | 12/2018 | Squiers .................... B26B 5/00 |
| 2008/0216619 | A1* | 9/2008 | Brackbill ............... B25B 15/00 |
| | | | 81/463 |

OTHER PUBLICATIONS

Camur Tool w/Leather Sheath, Online Catalog, Total of 4 pages.
Z-REX 4-in-1 Firefighter Multi-Tool, Online Catalog, Total of 3 pages.

* cited by examiner

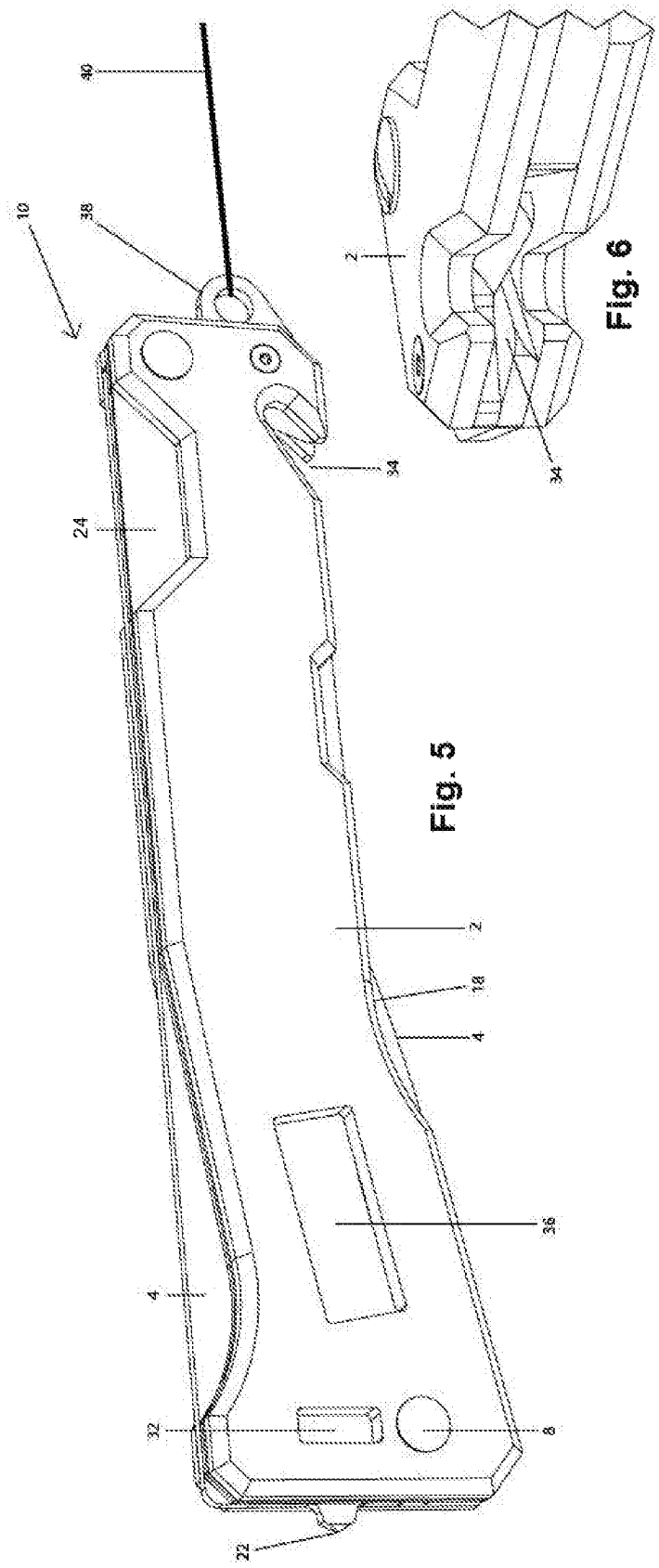

MULTI-FUNCTIONAL RESCUE TOOL WITH ANGLED BLADE

FIELD OF THE INVENTION

The present invention pertains to rescue tools for use by fire fighters and other first responders to conduct emergency operations.

BACKGROUND OF THE INVENTION

Firefighters among other first responders are responsible for rapid and effective responses to many and diverse emergency situations often involving rescues of entrapped persons in precarious and even life-threatening conditions due to multifarious causes including for example, medical ailments, accidental injuries, or being subject to an existing or impending hazard, such as a fire or radioactive or chemical intrusion. Emergency situations very often require use of specialized entry and access tools which can cause property damage. In many emergency situations, tools to open locked doors, both common doors to multi-unit dwellings and to individual dwellings without damaging the door frame or structure are needed. This is particularly needed when responding to fire alarms, which require the firefighter to survey and search all rooms of a building for fire, trapped individuals, and for activated smoke or heat detectors or activated fire alarm pull stations.

The nature and extent of danger, strife, injury and hazard encountered by first responders, particularly fire rescue workers, is vast, as well as very often unpredictable and rapidly evolving. In the face of mounting numbers and devastation of emergencies resulting from various causes including natural disasters such as fires, hurricanes and earthquakes, violence, accidents among other hazardous conditions, swift and sure rescue response is imperative.

An imperative component of many emergency calls is expeditious extrication of trapped individuals and abatement of hazardous conditions. Due to the multifarious types of emergencies encountered by a first responder and often rapid and unpredictable deterioration of an injured victim or a hazard such as a fire or poisonous gas, rapid and ready access to a range of rescue tools is often key to a successful rescue operation. For example, in vehicular accident emergencies, rescue and treatment of an injured victim very often entails extrication from a vehicle with doors damaged, nonfunctional door handles. Conventional tools and techniques include breaking vehicle windows and cutting seatbelts. Similarly, expediting extrication of entrapped victims of fire, flood, violent assaults, or other dangers entails tools for entry into a unit often secured by a locked door. It can thus be readily seen that providing a fire fighter or other first responder with an access tool enabling quick and smooth entry to a locked emergency scenario, together with a variety of other rescue tools, is key to a successful rescue operation.

In the past, firefighters had to carry numerous different rescue tools to be suitably prepared for the many and diverse potential tasks involved in rescue operations. Such tools were not only numerous but many were bulky and awkwardly configured. Storing, carrying, retrieving and switching between the tools wasted valuable time needed to execute a swift and smooth rescue operation. As a result, response times can be slowed and at times, rescue operations potentially crippled, and tragic consequences may result in the event of life-threatening emergencies.

A particular persisting problem not addressed by prior art rescue tools emanates from installations of blocker plates to intercept picking or disengagement of locks by burglars and other intruders. A blocker plate extends between a door knob and jamb frame over a latch to shield a spring lock from direct frontal access by a straight blade or even rigid card inserted in the gap between the door and frame to push and thereby disengage a spring lock. Adaptability for use on a wide variety of locks, frames and doors, both inward and outward swinging, and their strong, rigid construction resisting prying to expose the latch, availability of numerous designs and configurations has engendered widespread adoption of blocker plates, particularly o commercial buildings and multifamily dwellings. Blocker plates are constructed of rigid and strong materials and thus resistant to prying away from or chiseling off the door. Although blocker plates offer business owners and property managers of multifamily dwellings greater security, they render conventional tools for non-forcible or passive entry ineffective, leading to increased incidents of forcible entry and associated property damage.

Such conventional tools include shove knives which are slipped between a door and frame to push back a spring bolt as a passive way to manipulate a latch to gain entry in a structure. Unfortunately, however, use of blocker plates extending between a door knob and frame to shield a spring lock from direct frontal access has in many scenarios rendered shove tools ineffective. First responders must then resort to more aggressive measures or forcible entry resulting in damage to the door and often adjacent property, which therefore must be repaired or replaced. This not only imposes anxiety and expense of repairs upon the property owner, it also wastes critical time thereby delaying treatment of medical conditions or other rescue service needed in an emergency.

Shove tools are of a fixed configuration and unfortunately not adaptable to negotiate about variable sizes and orientations of blocker plates which like all security devices are in constant flux to foil disengagement by intruders. In the past, tools configured for entry into locked doors particularly if blocker plates are installed, have been typically handmade from a framing square, or flat piece of metal, and are cumbersome to carry. Such tools are big and not collapsible and thus not readily stored and carried, for example, in a firefighter's pocket, turnout gear or portable equipment pack. Such bulky tools are often left with the vehicle or back up equipment and therefore not readily accessible during rescue operations. Moreover, retrieving them from a rescue vehicle or back up equipment pack wastes critical time.

One system for obtaining access designed to address the shortcomings and limitations of conventional shove tools provides first responders with alternative modes for entry of locked premises. One such system is a "Knox box" located outside a common entrance to a multi-unit premises for which a first responder such as a firefighter is provided a security key. The security key opens a locked container, i.e., Knox box, containing keys to the building and units within it. Unfortunately, however, adoption of Knox boxes has not kept up with the need for first responder access, as many building owners are reluctant to invest and install the Knox box. Moreover, even when provided, problems impeding quick and facile entry by first responders persist. When multiple keys are provided, repeated trial and error to find the correct key. If a single set of multiple keys is provided, only one person can try each key, which then further delays entry. Moreover, the keys within the Knox box are all too often outdated and therefore will not unlock all doors in the building. Hence, is a worst case scenario, after a single set of keys in the Knox box has delayed the trial and error process of unlocking doors, it turns out that no key unlocks the door accessing the emergency scenario. After losing critical time needed for a successful rescue, first responders must nonetheless resort to forcible entry techniques. The resultant delay impedes the rescue operation, exasperating efforts, and potentially exacerbating damage and injuries as emergency circumstances deteriorate.

Hence, it can be readily seen that in the midst of added entry-impeding security measures such as blocker plates installed in dwellings, there remains a persisting and urgent need for a compact yet adaptable and facile rescue tool including an entry tool capable of passive disengagement of door locks, and circumventing blocker plates in order to enable swift and efficacious access to locked premises without causing property damage while also providing multiple and diverse functionalities commensurate to the variable extent of emergencies confronting fire fighters and other first responders during rescue operations.

SUMMARY OF THE INVENTION

Such and other drawbacks and shortcomings of prior art rescue tools are addressed by multifunctional rescue tool of the present invention, including an angled blade pivotable into a handle for ready and facile disengagement of a locked bolt behind a blocker plate to access a building during a rescue operation. This multifunctional rescue tool features an angled blade having a base portion and an integral elongate distal portion having a contiguous planar surface, wherein an angle is formed between the base portion and elongate distal portion pivotally foldable into a handle having a corresponding slot configured with a base portion and an integral elongate distal portion for receiving at least a portion of the blade. A joint mechanism pivotally couples the base portion of the blade within a base portion of the angled slot such that the angled blade is capable of being pivoted out of and with the corresponding slot configured for housing the angled blade. In a particularly preferred embodiment of the present invention, the angle formed between the base portion and elongate distal portion of the blade is substantially perpendicular, and in a particularly preferred embodiment the angle therebetween is substantially perpendicular. A lock mechanism engages the base portion within the handle such that the elongate distal portion of the angled blade extends outwardly to form corresponding predetermined angles between the elongate distal portion of the angled blade and a substantially longitudinal axis of the handle. The angled blade locks to a fixed outermost position wherein the elongate distal portion of the angled blade forms a substantially perpendicular angle with a substantially longitudinal axis coextending through base portion 4A and handle 2. In alternative embodiments, the angled blade according to the present invention may be articulated to lock into one or more further corresponding predetermined angles. The lock mechanism of the present invention may utilize various commercially available spring latch mechanisms well known in the industry. One such mechanism employs a pin lock that engages the blade when pulled out of the slot to a fully extended or open position, releasable when suppressed to disengage the lock to enable a user to manually push the angled blade about the joint mechanism to pivot into the corresponding slot of the handle.

A lock mechanism of a particularly preferred embodiment of the present multifunctional rescue tool employs a lever releasable from a closed to an open position by grasping an edge at a fingergrip opening to disengage a pivot pin and a corresponding leaf spring thereby releasing a lever having a protuberance configured for coupleable engagement with one or more corresponding recesses on a periphery of the base portion of the blade, as described in detail below. In one embodiment, coupleably engaging the protuberance with a plurality of corresponding recesses at the periphery of the base portion locks the angled blade in a closed position and respective open positions when pivoted about joint mechanism so as to seatably engage the protuberance within a corresponding recess to position the elongate distal portion of the angled blade at a corresponding plurality of predetermined angles. In a particularly preferred embodiment of the present invention, the lever protuberance is lockably seated within an outermost corresponding recess on the periphery of the base portion of the angled blade so as to lock the elongate distal portion of the angled blade in a substantially perpendicular orientation with a substantially longitudinal axis coextending through the base portion and handle when in substantial alignment.

Alternative embodiments of the present invention further include a plurality of corresponding recesses about a periphery of the base portion of the angled blade, wherein the recesses are spaced apart at predetermined intervals such that corresponding predetermined angles between the base portion of the blade and the handle are formed when the protuberance of the lever is engaged with a corresponding recess on the periphery of the base portion of the blade pivotable about a joint mechanism. A particularly preferred embodiment in includes lever recesses spaced apart at predetermined distances to set the blade at corresponding predetermined angles between the distal elongate portion of the blade and the handle of 45, 60, and 75 degrees. In a yet another particularly preferred embodiment the blade is locked at the further corresponding predetermined angles between the base portion of the blade and the handle of 30 degrees. In addition to the aforedescribed latch disengaging function of the present invention, the pivotable angled blade provides a second function as a guide for swift construction of tool speed squares with four separate angle settings of 30, 45, 60, and 90 degrees for support of building raker shores to thereby stabilize walls to enable rescues conducted in confined spaces, particularly trenches. The plurality of predetermined angles provided by the latter two embodiments provide the additional functionality of facilitating angle cuts for constructing raker shores angled to stabilize and support unstable walls of structures and sides of trenches during rescue operations.

Further features of the multi-functional rescue tool according to the present invention include, without limitation, a multi-wrench tool, gas shut off wrench, ruler, oxygen tank wrench, seatbelt cutter, window or glass punch, shove knife, and speed squares with four separate angle settings for constructing raker shores to thereby brace and stabilize walls, particularly important for rescues entailing support of walls in confined spaces or reinforcing the sides of a trench during rescue. The multi-functional tool of the present invention thus provides a compact and facile tool combining tool components heretofore not provided in a single rescue tool thereby enabling firefighters and other first responders to save time, property and lives more efficiently.

BRIEF DESCRIPTION OF THE DRAWINGS

FIG. 5. Is a perspective view of an opposing side of the multifunctional tool of the present invention in a closed position of FIG. 4.

FIG. 6 is a close up view of the seatbelt cutter blades of the present invention.

DETAILED DESCRIPTION OF A PREFERRED EMBODIMENT

Figure 1:
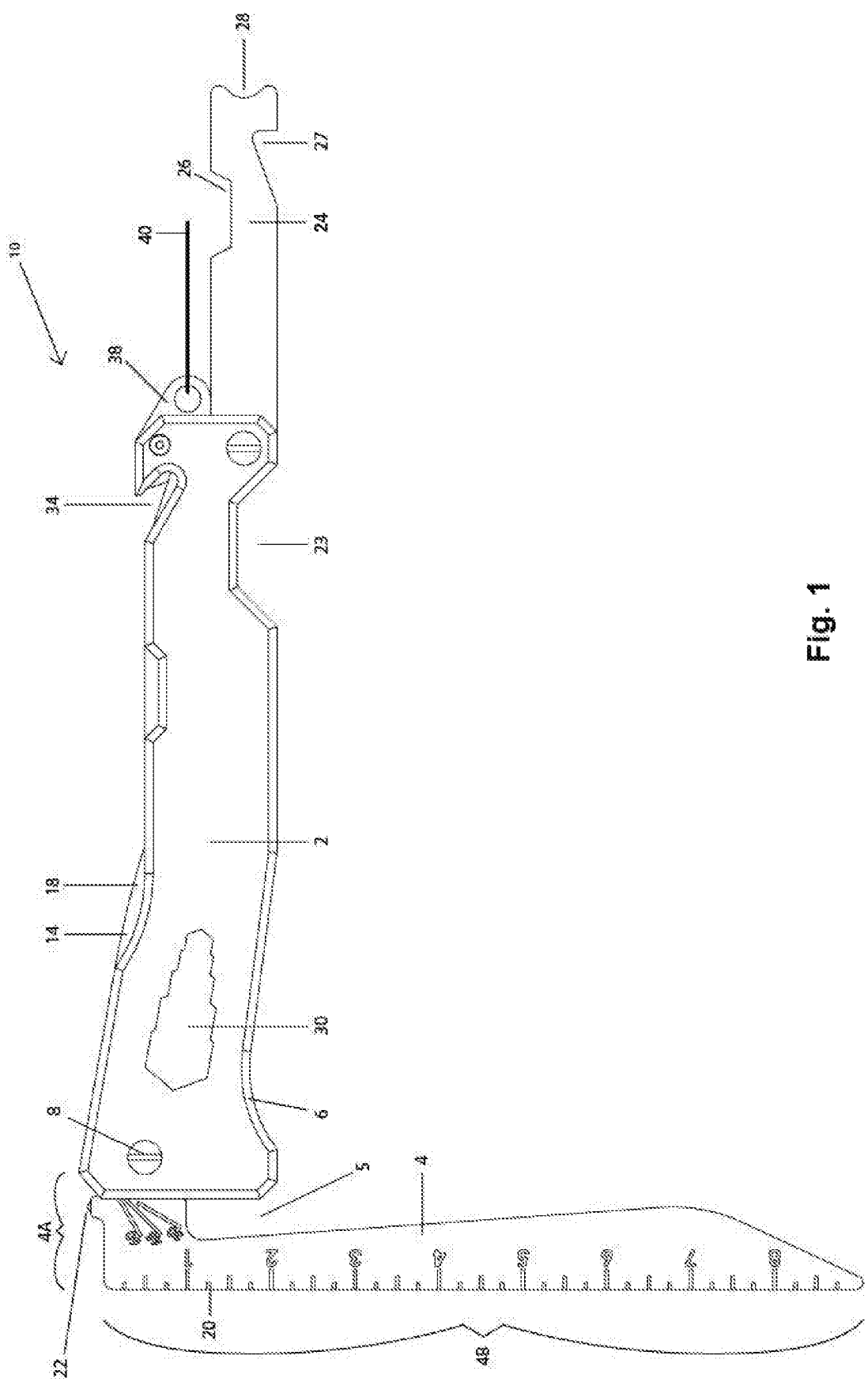
FIG. 1 is a perspective view of the multifunctional tool of the present invention in a locked open position.

A preferred embodiment of the present invention depicted in FIGS. 1-6 is a multi-functional rescue tool 10 including a handle 2 wherein angled blade 4 is pivotable into angled blade slot 6 wherefrom it is pivotably mounted to rotate about joint mechanism 8. Rescue tool 10 may be composed of any durable rigid preferably a heat resistant, high grade, lightweight metal, alloy or other suitable material such as, for example, stainless steel, titanium, aluminum, carbon fiber. Handle 2 may be configured in various shapes and sizes so long as the overall dimensions are suitable for inserting in a pocket or other small compartment.

Angled blade 4 includes a base portion 4A wherefrom elongate distal portion 4B extends at an angle to form a contiguous plane along a substantially longitudinal axis. In the illustrated preferred embodiment, the angle formed between base portion 4A and elongate distal portion 4B is substantially perpendicular.

Figure 2:
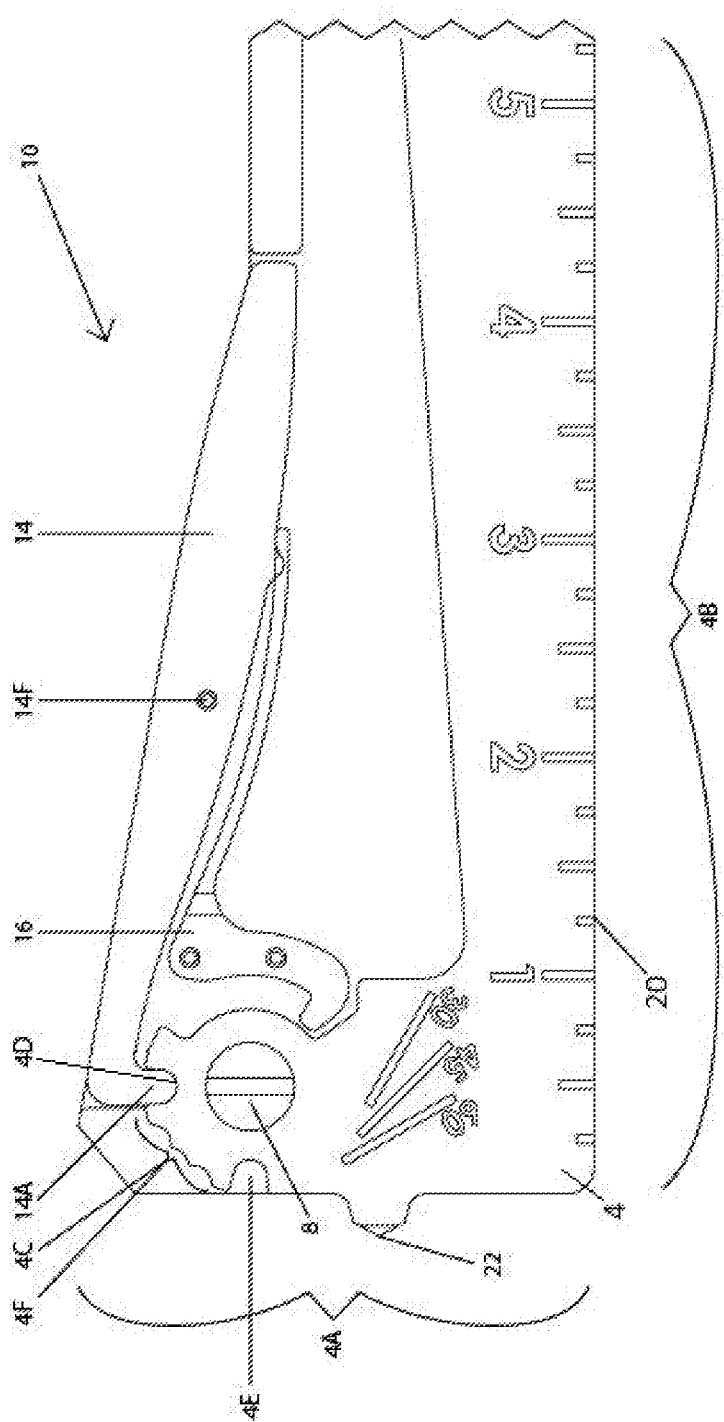
FIG. 2. is a cutaway view of the multifunctional tool of the present invention in a closed position.
Figure 3:
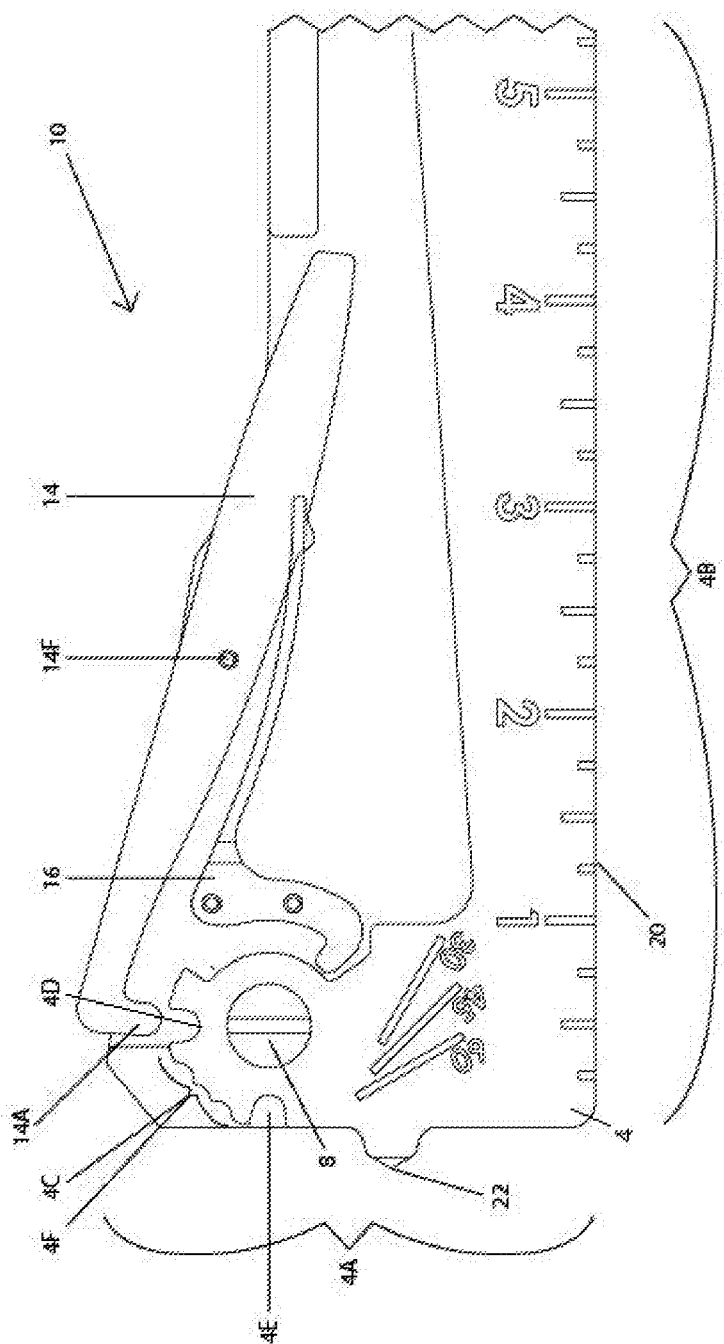
FIG. 3 is a cutaway view of the multifunctional tool of the present invention released for pivoting to a locked open position.

Now referring to FIGS. 2-3, angled blade 4 has a base portion 4A having a pivot end with recesses 4D and 4E on a periphery of the base portion of angled blade 4. Recesses 4D and 4E are configured and juxtapositioned with lever 14 such that protuberance 14A protruding downward from an end of lever 14 is coupleably engagable with first corresponding recess 4D locking angled blade 4 in closed position and second corresponding recess 4E locking blade 4 in a locked open position. In closed position, lever 14 is housed in corresponding slot 16 in the handle opposing slot 6. When lever 14 is in closed position within corresponding slot 16, protuberance 14A is coupleably engaged in recess 4D. Lever 14 is releasable to pivot outwardly from a closed in corresponding slot 6 to an open position by grasping an edge at a fingergrip opening 18 to press and thereby release lever pivot pin 14F. Release of lever pivot pin 14 F disengages leaf spring 16. Upon spring disengagement, lever 14 is released such that protuberance 14A lifts out of first corresponding recess 14D and simultaneously releases angled blade 4 thus enabling it to be pivoted about joint mechanism 8 outwardly from slot 6 such that protuberance 14A is coupleably engaged in second corresponding recess 4E thereby locking angled blade 4 in open locked position wherein base portion 4A is substantially aligned with handle 2 thereby locking elongate distal portion 4B in substantially perpendicular alignment with a horizontal axis extending through base portion 4A and handle 2.

Still referring to FIGS. 2 and 3, angled blade base portion 4A further includes recesses 4F spaced apart at predetermined intervals for seatable engagement with protuberance 14A such that corresponding predetermined angles between elongate distal portion 4B and a longitudinal axis coextending through base portion 4A and handle 2 are formed. In particular, as angled blade 4 is released and pivoted outwardly, protuberance 14A seatably engages one of the three recesses 4F at predetermined points to form a desired one of predetermined angles of 30, 45 and 60 degrees between elongate distal portion 4B and a longitudinal axis coextending through aligned base portion 4A of angled blade 4 and handle 2, as illustrated in FIGS. 2 and 3.

As described and illustrated, angled blade 4 opens to lock base portion 4A in substantial alignment with handle 2 such that elongate distal portion 4B is positioned in substantially perpendicular alignment with the longitudinal axis coextending from handle 2 and base portion 4A of angled blade 4 when extended to an open position.

Angled blade 4 also serves a further function of providing a profile for tracing cut lines for building raker shores to brace walls of a structure or reinforce sides of a trench during rescue operations. Raker shores are cut lumber for construction of bracing used to support a wall or reinforce the sides of a trench during this type of rescue. Thus aligning angled blade 4 at points wherein protruberance 14A is seated in one of corresponding recesses 4F seats angled blade 4 to form angles 30, 45, 60 degrees for measurement of one or more raker shores. In alternative embodiments, additional recesses on periphery 4C may provide other corresponding predetermined angles. The speed squares thus enable expeditious construction of appropriately angled raker shores, thereby saving critical time.

An additional feature of the illustrated particularly preferred embodiment of the present invention includes ruler 20 provided along the outer periphery of elongate distal portion 4B of angled blade 4 including English, and in alternative embodiments metric designations, for ready and accurate measurement of encountered structures, objects, individuals, portals, etc. Ruler 20 on the distal edge of the blade provides the further functionality of measuring dimensions for cuts in constructing raker shores used for supporting unstable walls of structures and sides of trenches during rescue operations. In a particularly preferred embodiment, the ruler is nine inches in length.

An additional feature of the illustrated embodiment of the multifunctional rescue tool 10 is lanyard 38. Any number of items could be attached to lanyard 35 including a pet or to secure an item that cannot otherwise be carried or stowed. A particular feature of lanyard 35 is provides a ready access attachment to a firefighters' gear, preferably by a affixing a retractable line 40 that can be released for pulling out in use and then retracted to a closed position where it is latched onto the gear when not in use.

A yet further feature preferably integrally mounted on an outer periphery of base portion 4A of angled blade 4 is window punch 22. As shown, window punch 22 is a protuberance extending outward from base portion 4A of angled blade 4 to form a sharp point for focusing impact on single focal point to thereby break even shatterproof windows in order to extricate injured accident victims trapped in vehicles.

An additional tool component adding functionality to rescue tool 10 is seatbelt cutter 24 having dual razor edges embedded in handle 2 to facilitate slicing through belt and thereby expedite extrication of a trapped passenger.

Further functionalities provided by tool components not heretofore combined are included in the single rescue tool in the illustrated embodiment. Such tool components include shove knife 24 pivotally connected for being received in a corresponding shove knife slot in handle 2 and opened from a finger grip 23 and pivoting open to form a substantially aligned juxtaposition with handle 2. As illustrated in FIG. 1, shove knife 24 preferably includes notches 26 and 27 forming a concavity 28 on its distal end for disengaging a bolt of a locked door, particularly efficacious when there is no blocker plate about the lock assembly. In alternative embodiments, multifunctional rescue tool 10 may further include a cutting blade with or without notches or serrations.

Figure 4:
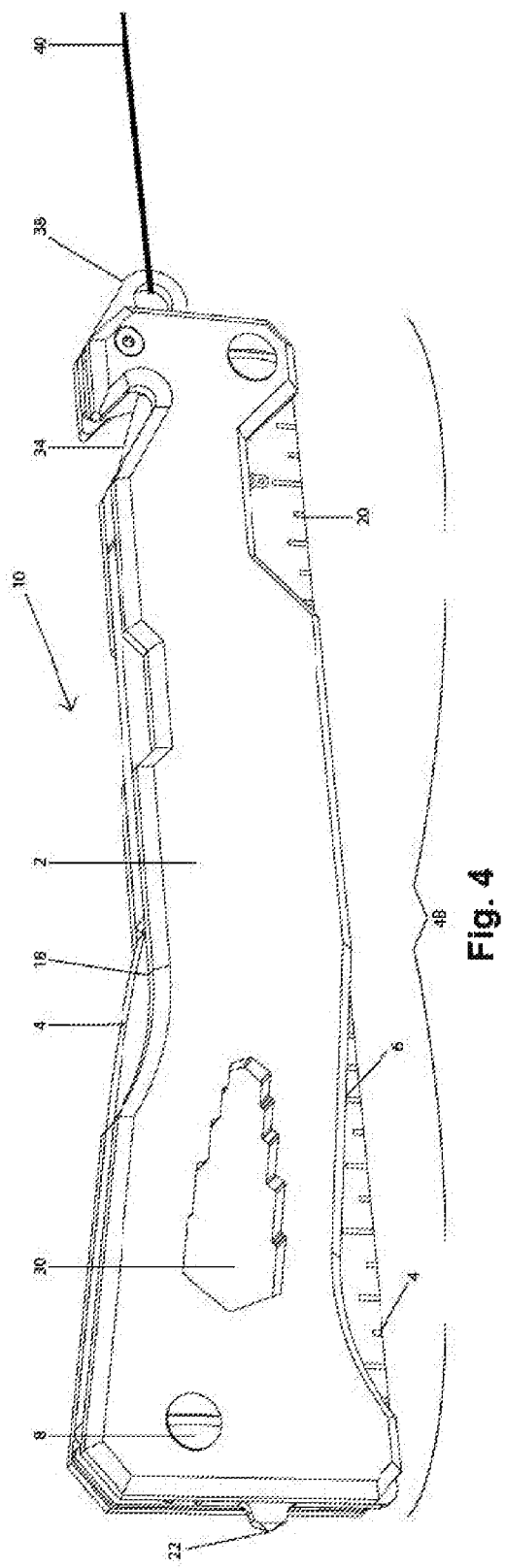
FIG. 4 is a perspective view of a side of the multifunctional tool of the present invention in a closed position.

Referring to FIG. 4, a yet further tool component of the illustrated preferred embodiment is Allen or hexagonal wrench 30 that are cut out of a side of handle 2 in dimensions to and configured to successively fit five commonly used multi-purpose wrench sizes of 8, 10, 13, 17, and 19 mm to fit a variety of hexagonal head screws and bolts for securing or detaching a diverse range of device and structural components including, for example, disassembling gates and other structures.

An efficacious feature of angled blade 4 is the inward tapering of the inner periphery of elongate distal portion 4B to a reduced width as it extends toward substantially perpendicularly oriented base portion 4A. The resulting space 5 along the end edge of slot 6 when angled blade 4 is in open position keeps clear the contiguous space between an end of handle 2 proximal to joint mechanism 8 and the juncture of base portion 4A and elongate blade portion 4B of angled blade 4 thereby providing a space to circumvent a blocker plate such that angled blade 4 can slip behind the blocker plate in order to disengage a lock behind it. Space 5 further provides for space within slot 6 coextending between adjacently positioned hexagonal wrench 30 and natural gas rectangular aperture 36 on opposing sides of handle 2 thereby enabling respective natural gas shutoff valve and bolts to pass through the extended aperture thereby facilitating removal of an opposing nut.

Now referring to FIG. 5, a yet further tool component of the illustrated preferred embodiment is rectangular aperture 36 measuring about ⅝×1 9/16 inches (1.59×3.97 cm) in handle 2 providing a functionality of a gas shut-off wrench for deactivating a natural gas valve particularly imperative during structure fires when turning off natural gas to thereby avoid explosions is one of the first steps in attacking the fire.

Still referring to FIG. 5, yet another tool component providing a further function of rescue tool 10 is oxygen tank rectangular aperture 32 measuring about ¼×⅝ inches (0.64×1.59 cm for activating and deactivating medical oxygen for patients in a respiratory crisis.

An alternative embodiments provides a feature of fortifying the cutouts in handle 2 by implanting stainless steel or other high shear strength material inserts facing to reinforce the outer periphery of cutouts in handle 2 to strengthen the contact points of hexagonal wrench 30, oxygen tank rectangular aperture 32 and natural gas rectangular aperture 36.

When locked into open position, the tapered periphery of elongate distal portion 4B of angled blade 4 conjoined with the perpendicularly oriented inner periphery of base portion 4A provides clearance space 5 that is substantially rectangular provides clearance for circumventing a blocker plate whereabout angled blade 4 is slipped while being inserted into the gap between the door and jamb to depress the latch and thus swiftly disengage a lock, typically within seconds. Angled blade 4 can thus be efficaciously inserted between a door and surrounding door jamb from either the top or bottom of the plate. Hence, proper wielding of rescue tool 10 will not damage a door, but rather leave it completely intact.

By thus combining tool components to thereby provide multiple functionalities in a single device, the present invention provides a multi-functional rescue tool providing first responders, particularly firefighters, with a compact, adaptable multi-use tool having functionalities to keep pace with the need for such a portable and facile tool enabling swift access and remediation to expedite rescue operations, particularly in accessing premises with latches shielded by blocker plates in order to deliver rescue services to entrapped victims subject to increasing numbers of emergencies caused by diverse and rapidly evolving dangers and hazards.

Hence, the multi-functional rescue tool of the present invention provides a readily carried and facile tool for efficaciously disengaging locks even if shielded by blocker plates, constructing rake shores, cutting seatbelts, breaking windows, shutting off gas valves, activating oxygen tanks as well as additional functionalities in to thereby avoid the bulk and step of sorting through multiple pieces imposed by tools having a single or more limited use imparts the advantages of enabling first responders to save time and focus for critical rescue operations The scope of the present invention is not delimited by the literal language of this specification and the appended claims. Rather, modifications, permutations, additions and sub-combinations are embraced by the spirit and scope of the invention. For example, alternative embodiments contemplated include a foldable blade articulable from a joint spaced a predetermined length from the base to form an angle of at least a substantially perpendicular orientation. Alternative configurations feature a blade that is straight or having an angle that is other than perpendicular, or include more than one angle. In alternative embodiments, the blade may be ratcheted. Yet further embodiments could include a retractable or slidable or sheathed blade. It is further contemplated that the multi-functional rescue tool could include one or more screwdriver sets, Allen wrenches, elevator access keys, hooks and other known rescue tools. It is further contemplated that alternative commercially available locking mechanisms could be incorporated to manipulate the angled blade according to the present invention. Hence, such and other variations are included in the scope of the invention, describe, illustrated and claimed herein.

The invention claimed is:

1. A multifunctional rescue tool comprising: a substantially right angled blade having a planar base portion with a pivot end and an elongate blade portion extending substantially perpendicularly from the planar base portion along an integral planar surface, wherein the pivot end of the planar base portion of the right angled blade has a plurality of recesses including a first recess and a second recess; a handle having a slot configured for receiving at least a portion of the right angled blade, wherein the pivot end is pivotally coupled to a receiving end of the slot of the handle such that the right angled blade is capable of being pivoted outwardly from and inwardly into the slot; and a lock mechanism for engaging the base portion of the angled blade, wherein the lock mechanism includes a lever having a protuberance on an end configured and juxtapositioned in the slot of the handle for coupleable engagement with the first recess and the second recess, such that coupled engagement with the first recess positions the right angled blade in a closed position and coupled engagement with the second recess locks the right angled blade in an open position whereby a portion extending from the pivot end of the planar base portion protrudes beyond a receiving end of the slot so as to configure a clearance space between the receiving end of the slot, a perpendicularly oriented inner periphery of a protruding surface of the planar base portion, and an inner surface of the elongated blade portion of the right angled blade for circumventing a blocker plate to thereby insert the right angled blade between a door and frame to disengage a lock.

2. The multifunctional rescue tool of claim 1, wherein the lock mechanism further comprises a pivot pin capable of disengagement from a corresponding aperture in the handle so as to pivotally release the lever for engagement with the one or more corresponding recesses on the periphery of the base portion of the right angled blade.

3. The multifunctional rescue tool of claim 1, wherein an outer peripheral edge of the elongate blade portion of the right angled blade is a ruler with markings spaced apart to enable measurements in English and metric designations.

4. The multifunctional rescue tool of claim 1, further comprising a lanyard affixed to the handle.

5. The multifunctional rescue tool of claim 4, wherein a retractable line is attached to the lanyard.

6. The multifunctional rescue tool of claim 1, further comprising at least one seatbelt cutter blade embedded within the handle.

7. The multifunctional rescue tool of claim 1, wherein the handle further comprises an aperture having a configuration of one or more hexagonal wrenches.

8. The multifunctional rescue tool of claim 7, wherein the handle further comprises a first rectangular aperture for coupled engagement with a gas valve positioned on an opposing side from the aperture having a configuration of one or more hexagonal wrenches so as to form a contiguous space coextending between the aperture having a configuration of one or more hexagonal wrenches and the first rectangular aperture to thereby enable pass through to the opposing aperture and, wherein the elongate blade portion of the right angled blade has an inner periphery tapering to a reduced width extending toward the planar base portion so as to provide clearance to maintain the contiguous space coextending between the aperture having a configuration of one or more hexagonal wrenches and the first rectangular aperture to thereby enable pass through to the opposing aperture when the right angled blade is in the closed position.

9. The multifunctional rescue tool of claim 1, wherein the elongate blade portion of the right angled blade has an inner periphery tapering to a reduced width extending toward the planar base portion.

10. The multifunctional rescue tool of claim 9, further comprising a second rectangular aperture for coupled engagement with an oxygen tank valve.

11. The multifunctional rescue tool of claim 1, wherein the plurality of recesses further comprise a third recess, a fourth recess and a fifth recess interspaced between the first recess and the second recess such that coupleable engagement of the protuberance of the lever with the third recess, fourth recess and fifth recess seats the elongate blade portion of the right angled blade such that respective corresponding predetermined angles of 30, 45 or 60 degrees are formed between the elongate blade portion of the right angled blade and a substantially longitudinal axis of the handle.

12. The multifunctional rescue tool of claim 1, further comprising:
a shove knife having an elongate planar surface with a proximate end and a distal end;
a corresponding shove knife slot in the handle; and
a pivot mechanism pivotally coupling the proximate end of the shove knife to the handle such that the shove knife is capable of being pivoted out of and into the shove knife slot to form a straight angle of 180 degrees with the handle when fully extended out of the shove knife slot.

13. A multifunctional rescue tool, comprising:
an angled blade having a base portion and an elongate distal portion extending at an outward angle from the base portion configured along an integral planar surface, wherein an inner periphery of the elongate distal portion tapers to a reduced width as it extends toward the base portion and wherein an outer peripheral edge of the elongate distal portion of the angled blade is marked with ruler measurements including English and metric designations, and wherein a periphery of the base portion of the angled blade has a plurality of recesses including at least a first recess and a second recess, and wherein the plurality of recesses further comprises a third recess, as fourth recess and fifth recess interspaced between the first recess and the second recess such that coupleable engagement of the protuberance with the third recess, fourth recess and fifth recess seats the elongate distal portion of the angled blade such that respective corresponding predetermined angles of 30, 45 or 60 degrees are formed between the elongate distal portion of the angled blade and the handle when in locked open position;
a handle having a slot configured with a base portion and an integral elongate distal portion for receiving at least a portion of the angled blade, wherein the handle has a first rectangular aperture for coupled engagement with a gas valve and a second aperture having a configuration of one or more hexagonal wrenches, wherein the first aperture and the second aperture form a contiguous space coextending between the first aperture and the second aperture to thereby enable pass through to the opposing aperture, and wherein the handle has a second rectangular aperture for coupled engagement with an oxygen tank valve;
a joint mechanism pivotally coupling the base portion of the angled blade to the base portion of the angled slot such that the angled blade is capable of being pivoted outwardly from and inwardly into the slot;
a lever receivable into a corresponding slot in the handle, and wherein the lever has a protuberance on an end configured and juxtapositioned in the handle for coupleable engagement with the first recess and the second recess, such that coupled engagement with the first recess positions the angled blade in a closed position and coupled engagement with the second recess locks the angled blade in the locked open position such that the elongate distal portion of the angled blade is substantially perpendicular to the base portion of the angled blade when in the base portion of the angled blade and the handle are substantially aligned along a substantially longitudinal axis in the locked open position;
a seatbelt cutter blade embedded within an end of the handle opposing the joint mechanism;
a lanyard affixed to the handle; and
a shove knife having an elongate planar surface pivotable outwardly from and inwardly into a corresponding shove knife slot in the handle.

14. The multifunctional rescue tool of claim 13, wherein the elongate distal portion of the angled blade has an inner periphery tapering to a reduced width so as to form a clearance space when in open position such that the angled blade is capable of circumventing a blocker plate being inserted between a door and a jamb to disengage a lock when in the open position and to maintain the contiguous space coextending between the aperture having a configuration of one or more hexagonal wrenches and the first rectangular aperture to thereby enable pass through to the opposing aperture when in the closed position.

15. The multifunctional rescue tool of claim 14, further comprising a retractable line affixed to the lanyard, wherein the retractable line is attachable to wearable gear and releasable therefrom for pulling out in use and then retractable to a closed position when not in use.

\* \* \* \* \*